United States Patent Office 3,290,303
Patented Dec. 6, 1966

3,290,303
SUBSTITUTED DIHYDRO-THIADIAZINES
Donald L. Trepanier, Indianapolis, Ind., assignor to The Dow Chemical Company, Midland, Mich., a corporation of Delaware
No Drawing. Filed Sept. 4, 1964, Ser. No. 394,624
11 Claims. (Cl. 260—243)

This invention is concerned with novel chemical compounds and is particularly directed to substituted 5,6-dihydro-4H-1,3,4-thiadiazines and mineral acid salts thereof.

The compounds of the invention are thiadiazines having the formula

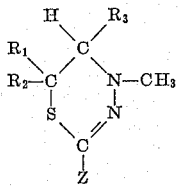

wherein $R_1$ represents phenyl, methyl, ethyl, or hydrogen, $R_2$ and $R_3$ independently represent hydrogen or methyl and Z represents cyclohexyl, benzyl, phenyl, or substituted phenyl, and the mineral acid salts thereof. When Z is substituted phenyl, suitable substituents include one or two substituents selected from halogens and lower alkyl, lower alkoxy, hydroxy and nitro groups. As employed in the present specification and claims the terms "lower alkyl" and "lower alkoxy" refer to such groups containing from 1 to 4 carbon atoms, inclusive. The above compounds are crystalline solids or high-boiling liquids, somewhat soluble in organic solvents, such as chloroform and acetone, and relatively insoluble in water. Mineral acid salts of the above thiadiazines, such as the hydrochloride and hydrobromide salts, are readily prepared and are generally crystalline solids.

The new compounds may be prepared by various methods. In one such method, a 2($\beta$-hydroxy-alkyl) acid hydrazide of the formula

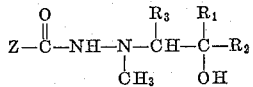

is heated with a substantially equimolar proportion of phosphorus pentasulfide in a suitable solvent. In this and succeeding formulae, the R symbols and Z have the significance set forth above. On completion of the ensuing reaction, the resulting thiadiazine product may be recovered by conventional procedures such as crystallization, washing, and/or vacuum distillation.

The 2($\beta$-hydroxy-alkyl) acid hydrazides employed as intermediates in the above method for producing the compounds of the invention may be prepared by reacting a suitable N-amino-$\beta$-methyl-aminoethanol with an acyl chloride of the formula Z—COCl followed by selective hydrolysis, if necessary. Since the N-amino-$\beta$-methyl-aminoethanols employed as starting materials have both amino and hydroxy functions in the same molecule, it is possible to react two moles of the acyl chloride with each mole of amino alcohol. With such reactants in which $R_1$ is phenyl, such as N-amino-ephedrine, the hydrazide is obtained almost exclusively without esterifying the alcohol group. However, in most other cases, it is necessary to employ two moles of the acyl chloride per mole of the amino alcohol to produce an ester-hydrazide intermediate. The ester linkage in the latter can then be selectively hydrolysed by warming in an aqueous ethanolic solution containing alkalinity as sodium hydroxide equivalent to from about 0.05 N to 0.15 N alkali. The reaction of the acyl chloride with the amino alcohol proceeds readily with elimination of hydrogen chloride of reaction. This reaction is preferably carried out in a suitable organic solvent containing a hydrogen chloride receptor such as pyridine or a tertiary alkyl amine.

Certain of the thiadiazines, namely those wherein $R_1$ is phenyl and Z is phenyl or substituted phenyl, may be prepared by a cyclodehydration reaction accomplished by dissolving a thio-acyl hydrazide having the formula

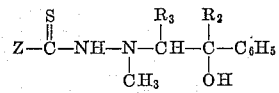

in an excess of concentrated sulfuric acid. The thio-acyl hydrazides can be prepared by reacting a substituted hydrazine, such as an N-amino-ephedrine, with a dithiobenzoate following the general procedure described by Jensen and Pedersen, Acta Chem. Scand. 15, 1087–1096 (1961). The thiadiazine resulting from the above cyclodehydration reaction may be precipitated by diluting the sulfuric acid with ice or cold water and separating the thiadiazine by filtration or extraction with a suitable organic solvent.

When the carbons numbered "5" and "6" in the thiadiazine ring are unsymmetrically substituted, that is, when $R_3$ is methyl and $R_1$ and $R_2$ are different from one another, cis and trans isomers can be formed. These isomers can usually be separated on the basis of differing solubilities. The identification of such isomers as cis or trans was determined by nuclear-magnetic resonance measurements.

The following examples illustrate the invention but are not to be construed as limiting the same.

EXAMPLE 1

3.28 grams (0.01 mole) of 1-methyl-1(1-methyl-2-hydroxy-2-phenylethyl)-2-(o-ethoxybenzoyl) hydrazine and 2.5 grams (0.011 mole) of phosphorus pentasulfide were dispersed in 50 milliliters of chloroform and the mixture heated at reflux temperature with stirring for four hours. The mixture was then cooled and thoroughly mixed with 75 milliliters of cold aqueous 15 percent sodium hydroxide solution. The resulting mixture formed two immiscible layers. The chloroform layer was separated and the alkaline aqueous layer washed with further chloroform which was separated and combined with the first chloroform layer. The combined chloroform layers were washed successively with aqueous 10 percent sodium hydroxide and with water and then dried over anhydrous magnesium sulfate. The dried chloroform solution was evaporated under vacuum leaving the crude thiadiazine product as a gummy residue. The latter was rubbed into suspension in a small amount of ether, filtered off, washed with ether and dried in a vacuum desiccator over anhydrous calcium chloride. The resulting product was recrystallized from ethyl acetate to obtain a cis-2-(o-ethoxyphenyl) - 5,6 - dihydro-4,5-dimethyl-6-phenyl-4H-1,3,4-thiadiazine product as crystals melting at 153°–154° C. and containing 70.18 percent carbon, 6.97 percent hydrogen and 9.91 percent sulfur by analysis as compared to theoretical percentages of 69.90, 6.79 and 9.82, respectively, calculated for said thiadiazine. The infrared spectrum of the product was in agreement with the assigned structure.

EXAMPLE 2

Following the procedure of Example 1, except that the final recrystallization was from ethanol, other 1-methyl-1(1-methyl-2-hydroxy-2-phenylethyl) - 2 - (aroyl) hydrazines were reacted with substantially equimolar proportions of phosphorus pentasulfide to prepare the corresponding 2-(substituted phenyl)-5,6-dihydro-4,5-dimethyl-6-phenyl-4H-1,3,4-thiadiazines. The substituted phenyl group at the 2-position (designated as Z in the generic formulae above), the configuration of the groups at carbons 5 and 6 and the characteristic melting points of the thiadiazine products are summarized in the following table.

| Group at 2-Position | Configuration | Melting Point, °C. |
|---|---|---|
| 4-Ethoxyphenyl | cis | 98–99 |
| 2-Methoxyphenyl | trans | 102–105 |
| 4-Tolyl | cis | 78–80 |

EXAMPLE 3

β-Methylaminoethanol was reacted with nitrous acid to produce N-nitroso-β-methylaminoethanol and the latter was reduced with lithium aluminum hydride to produce N-amino-β-methylaminoethanol. One molar proportion of N-amino-β-methylaminoethanol was reacted with two molar proportions of cyclohexanecarbonyl chloride in an aromatic solvent including two molar proportions of pyridine as a hydrogen chloride acceptor to produce 1-methyl-1 - (β - cyclohexanecarbonyloxyethyl) - 2 - cyclohexanecarbonyl) hydrazine and the latter was selectively hydrolysed with about 0.15 N sodium hydroxide in aqueous ethanol solution at 70° C. to produce 1-methyl-1-(β-hydroxyethyl)-2-(cyclohexanecarbonyl) hydrazine (melting point, recrystallized from isopropyl ether: 95°–96° C.).

Ten grams (00.5 mole) of 1-methyl-1-(β-hydroxyethyl)-2-(cyclohexanecarbonyl) hydrazine and 15 grams (0.06 mole) of phosphorus pentasulfide were dispersed in 200 milliliters of anhydrous toluene and the mixture heated under reflux for 15 hours employing a trap to separate water from the refluxing liquid. The resulting toluene solution was washed successively with aqueous 10 percent sodium hydroxide solution and water and then dried over anhydrous magnesium sulfate. The dried solution was evaporated under vacuum leaving the crude thiadiazine product as a residue in the form of a brown viscous oil. The latter was dissolved in hot ethyl acetate and ethyl ether saturated with hydrogen chloride added thereto to precipitate a 2-cyclohexyl-5,6-dihydro-4-methyl-4H-1,3,4-thiadiazine hydrochloride product, melting at 131°–132° C. (with decomposition) after recrystallization from ethyl acetate.

EXAMPLE 4

199 grams (0.66 mole) of 2-methyl-2-(α-methyl-β-hydroxy-β-phenethyl)-p-anisic acid hydrazide (alternatively named 1-methyl-1-(1-methyl-2-hydroxy-2-phenylethyl)-2-p-anisoyl-hydrazine) and 172 grams (0.66 mole) of phosphorus pentasulfide were dispersed in 1000 milliliters of chloroform and the resulting mixture heated under reflux with stirring for two hours. The mixture was then cooled, washed with aqueous sodium hydroxide solution and with water and concentrated by evaporation of chloroform. The resulting oil was adsorbed on a chromatographic column consisting of two pounds of acid-washed alumina packed in a column 4.5 cm. x 75 cm. The chromatogram was developed and eluted with chloroform. The first 2500 milliliters of eluate was collected and the chloroform evaporated therefrom under vacuum to obtain the product as an oil residue. The latter crystallized when stored overnight at 4° C. The resulting crystalline material was dissolved in ethanol and fractionally crystallized to obtain cis-2-(p-methoxyphenyl)-5,6-dihydro-4,5-dimethyl-6-phenyl-4H-1,3,4-thiadiazine, as the less soluble product, melting at 119°–121° C. and trans-2-(p-methoxyphenyl) - 5,6 - dihydro - 4,5 - dimethyl - 6 - phenyl-4H-1,3,4-thiadiazine, melting at 86°–89° C.

EXAMPLE 5

Following the general procedure of Example 4, other 1-methyl - 1(1 - methyl - 2 - hydroxy - 2 - phenylethyl) - 2- (aroyl) hydrazines were reacted with substantially equimolar proportions of phosphorus pentasulfide to prepare the corresponding 2-(substituted phenyl)-5,6-dihydro-4,5-dimethyl-6-phenyl-4H-1,3,4-thiadiazines and the latter were separated chromatographically as in said Example 4. The substituted phenyl group in the 2-position of the resulting thiadiazine products, the melting points thereof and the solvents employed for recrystallization are set forth in the following table. The cis isomer was isolated for each of these products.

| Group at 2-Position | Melting Point, °C. | Recrystallization Solvent |
|---|---|---|
| 4-chlorophenyl | 69–70 | Ethanol. |
| Phenyl | 90–91.5 | Do. |
| 2,4-dichlorophenyl | 117–119 | Isopropyl Ether. |

EXAMPLE 6

22.2 grams (0.1 mole) of phosphorus pentasulfide was dispersed in 150 milliliters of chloroform and a chloroform solution of 22.2 grams (0.1 mole) of 2-methyl-2(β-hydroxy-propyl) phenylacetic acid hydrazide was added thereto drop-wise with stirring. This mixture was stirred and heated under reflux for 18 hours. The resulting solution was mixed with an aqueous 10 percent sodium hydroxide solution. On standing, the resulting mixture separated into two layers; the organic layer was isolated and washed successively with aqueous sodium hydroxide solution and water. The washed organic layer was dried over anhydrous magnesium sulfate and the chloroform removed therefrom by evaporation under vacuum to leave the crude thiadiazine product in the form of a yellow oil. The latter was distilled under high vacuum to obtain the desired 2-benzyl - 5,6 - dihydro - 4,6 - dimethyl - 4H - 1,3,4-thiadiazine product as a straw colored oil boiling at 135°–140° C. under a pressure of 0.5 millimeter of mercury. This product was found to contain 65.31 percent by weight of carbon, 7.43 percent by weight of hydrogen and 14.95 percent by weight of sulfur by analysis as compared to corresponding percentages of 65.41, 7.32 and 14.55, respectively, calculated for said thiadiazine by theory. The infrared absorption spectrum for this thiadiazine was in agreement with the assigned structure.

EXAMPLE 7

The procedure of Example 6 was repeated employing 23 grams (0.1 mole) of 2-methyl-2-(β-hydroxy-isobutyl)-toluic acid hydrazide instead of the phenylacetic acid hydrazide of said Example 6. The reaction mixture was worked up as in the preceding example and the crude product distilled to obtain a 2-(p-tolyl)-5,6-dihydro-4,6,6-trimethyl-4H-1,3,4-thiadiazine product as a straw colored oil boiling at 145°–148° C. under a pressure of 0.35 millimeter of mercury. The nuclear-magnetic resonance spectrum confirmed the structure assigned.

EXAMPLE 8

24 grams (0.1 mole) of 2-methyl-2(β-hydroxy-isobutyl)-O-methoxybenzoyl hydrazide was suspended with stirring in 300 milliliters of carbon and 22 grams (0.1 mole) of phosphorus pentasulfide added thereto. The mixture was stirred and heated under reflux for 22 hours. The resulting solution was cooled, mixed with about an equal volume of aqueous 10 percent sodium hydroxide solution, the resulting mixture stirred for 15 minutes and thereafter separated into an aqueous phase and an organic phase. The organic phase was washed twice with water, dried over anhydrous magnesium sulfate and the chloroform removed therefrom by evaporation under vacuum. The crude thiadiazine product was obtained as a residue from the evaporation in the form of an oily liquid. The latter was distilled under high vacuum to obtain a 2-(o-methoxy - phenyl) - 5,6 - dihydro - 4,6,6 - trimethyl-4H-1,3,4-triadiazine product as a straw colored oil boiling at 145°–147° C. under a pressure of 0.7 millimeter of mercury.

EXAMPLE 9

A series of S-carboxymethyl-dithiobenzoates was prepared through the thiobenzpiperidides by the method described by Jensen and Pedersen, Acta Chem. Scand. 15, 1087–1096 (1961). The carboxymethyl dithiobenzoates may be represented by the formula $$Z-CSS-CH_2-COOH$$

Representative compounds of this formula together with their characteristic melting points are set forth in the following table.

| Z-constituent on carboxymethyl-dithiobenzoates: | Melting point, ° C. |
|---|---|
| p-Fluorophenyl | 126–127 |
| p-Hydroxyphenyl | 189.5–191.5 |
| p-Nitrophenyl | 113–115 |
| 2,3-dimethoxyphenyl | 100–102 |
| 3,4-dimethoxyphenyl | 151.5–153 |
| 3,4-dichlorophenyl | 130–132 |

Each of the foregoing carboxymethyl-dithiobenzoates was employed to thioacylate N-amino-1-ephedrine as indicated hereinafter.

EXAMPLE 10

53 grams (0.25 mole) of carboxymethyl dithiobenzoate (melting point: 125.5–127° C. recrystallized from petroleum ether) and 10 grams of sodium hydroxide were dissolved in 1.5 liters of water and 45 grams (0.05 mole) of N-amino-1-ephedrine added thereto with stirring. Stirring of the mixture was continued for one hour at room temperature and the mixture was then placed in a cold chamber for three days. The aqueous portion of the mixture was separated from the gummy product by decantation and the product dissolved in methylene chloride. The resulting solution was washed twice with water and dried over anhydrous sodium sulfate. The solvent was then removed by evaporation under vacuum to recover 2-methyl-2(α-methyl-β-hydroxy-β-phenethyl) thiobenzoic acid hydrazide as a yellow viscous oil.

39.5 grams (0.13 mole) of the above crude hydrazide was dissolved in 100 milliliters of methylene chloride and the resulting solution added gradually with stirring to 300 milliliters of concentrated sulfuric acid. The resulting mixture was stirred at room temperature for fifteen hours and then poured into a mixture of two kilograms of crushed ice and 500 milliliters of chloroform. The chloroform solution was separated from the aqueous acid layer and the latter extracted twice more with chloroform. The three chloroform extracts were combined and washed once with water, twice with saturated sodium bicarbonate solution and again with water. The washed chloroform solution was dried over anhydrous sodium sulfate and the solvent recovered therefrom by distillation under vacuum to obtain a crude reaction product as a brown oily residue. This residue was taken up in chloroform and purified by chromatographic adsorption on acid washed alumina. The product was eluted from the alumina with chloroform and the eluate concentrated by evaporization under vacuum to obtain a tan colored viscous oil which crystallized on cooling. The crystallized material was recrystallized from ethanol to obtain the desired trans-5,6-dihydro-4,5-dimethyl-2,6-diphenyl-4H-1,3,4-thiadiazine as a white crystalline solid melting at 68°–69.4° C. and containing 72.51 percent by weight of carbon, 6.71 percent by weight of hydrogen and 11.34 percent by weight of sulfur as compared to percentages of 72.30, 6.42 and 11.35, respectively, calculated for said thiadiazine compound by theory.

EXAMPLE 11

To a stirred solution of 0.5 mole of one of the carboxymethyl dithiobenzoates of Example 9 and 20 grams of sodium hydroxide in about 1800 milliliters of water, 90 grams (0.5 mole) of N-amino-1-ephedrine was added while maintaining the mixture at a temperature of from about 20° to 50° C. Stirring was continued until further stirring became difficult because of the gummy nature of the product formed. The reaction mixture was then maintained at room temperature for about one week. Thereafter the aqueous layer was decanted and the gummy product dissolved in chloroform. The chloroform solution was washed several times with water and dried over anhydrous sodium sulfate. The solution was then concentrated by evaporation of the chloroform under vacuum to obtain a substituted hydrazide of the formula

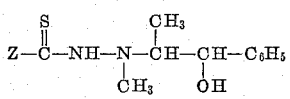

as a yellow to brown viscous oil.

The hydrazides so prepared were cyclodehydrated to trans-thiadiazines by the following general method. It will be apparent that the absolute amounts of reactants and solvents can be varied provided the relative proportions remain substantially unchanged.

0.5 mole of one of the hydrazides is dissolved in about 100 milliliters of methylene chloride and the resulting solution added slowly with stirring to 600 milliliters of cold, concentrated sulfuric acid. The resulting mixture was stirred for 15 hours at room temperature and then poured into a stirred mixture of 4 to 5 kilograms of crushed ice and one liter of chloroform. The chloroform layer was separated and the aqueous acidic layer extracted with three successive further portions of chloroform. All the chloroform layers were combined and the combined chloroform solution washed with water, then twice with saturated sodium bicarbonate solution and again with water and then dried over anhydrous sodium sulfate. Chloroform was recovered from the dry solution by distillation under vacuum to leave as a residue the crude thiadiazine product in the form of a dark oil which generally crystallized on standing. The product was worked up by conventional procedures such as decolorization with activated charcoal or chromatographing on acid-washed alumina and recrystallizing from ethanol to yield a trans-2(substituted phenyl)-5,6-dihydro-4,5-dimethyl-6-phenyl-4H-1,3,4-thiadiazine as a crystalline solid. In each case the assigned structure was confirmed by analysis for carbon, hydrogen and sulfur and by infrared spectrum and nuclear-magnetic resonance measurements. The melting points and substituents at the 2-position (Z) of the compounds so prepared are summarized in the following table:

*Trans-2(substituted phenyl)-5,6-dihydro-4,5-dimethyl-6-phenyl-4H-1,3,4-thiadiazines*

| Group at 2-position: | Melting point, ° C. |
|---|---|
| p-Fluorophenyl | 119–120.5 |
| p-Hydroxphenyl | 147–148.5 |
| p-Nitrophenyl | 127–128 |
| 2,3-dimethoxyphenyl | 95.5–97 |
| 3,4-dimethoxyphenyl | 105–107 |

The new compounds have been found useful as monoamine oxidase inhibitors in rats and can thus be employed to study the mechanism of action of depressant and antidepressant drugs. Surprisingly, these compounds did not show antidepressant activity characteristic of monoamine oxidase inhibitors in mice. Representative compounds were administered to albino rats in feed containing 0.3 percent of one of the representative thiadiazine compounds for periods of 9 to 10 days and the rats were then sacrificed and the monoamine oxidase activity of the minced brain tissue determined by the method of Weissbach et al., J. Biol. Chem., 235, 1160 (1960). Results are summarized in the following table wherein the "percent MAO inhibition" refers to the percentage reduction in monoamine oxidase activity of the brain tissue from the rats treated with thiadiazines as compared to the monoamine oxidase activity for brain tissue from untreated rats.

| Substituents on 5,6-dihydro-4H-1,3,4-thiadiazines: | Percent MAO inhibition |
|---|---|
| 2(o-methoxyphenyl)-4,5-dimethyl-6-phenyl | 37 |
| 2(3,4-dimethoxyphenyl)-4,5-dimethyl-6-phenyl | 45 |
| 2(p-nitrophenyl)-4,5-dimethyl-6-phenyl | 52 |
| 2(p - chlorophenyl) - 4,6 - dimethyl (hydrobromide) | 66 |
| 2(p-methoxyphenyl) - 4,6 - dimethyl (hydrobromide) | 73 |
| 2-phenyl-4,6-dimethyl (hydrochloride) | 88 |

The compounds of the invention are also useful as antimicrobial agents and for such use the compounds in which $R_1$ is methyl and $R_2$ is methyl or hydrogen are preferred. In a representative operation, trans-2,6-diphenyl-5,6-dihydro-4,5-dimethyl-4H-1,3,4-thiadiazine was dispersed in bacterial nutrient agar medium in Petri dishes in the amount of 0.05 percent by weight of said medium. The agar medium surface was then inoculated with a culture of *Staphylococcus aureus* organisms and the medium was incubated at 35° C. Substantially complete inhibition of the growth of *Staph. aureus* was obtained.

In further operations, using the agar cup zonal inhibition test, good inhibition of growth of *Staphylococcus aureus, Escherichia coli* and *Pseudomonas aeruginosa* was obtained with about 0.2 milliliter of a one-percent by weight solution in acetone of 2-phenyl-5,6-dihydro-4,6-dimethyl-4H-1,3,4-thiadiazine, of 2(p-chlorophenyl)-5,6-dihydro-4,6-dimethyl-4H-1,3,4-thiadiazine hydrobromide or of 2(p-methoxyphenyl)-5,6-dihydro-4,6-dimethyl-4H-1,3,4-thiadiazine hydrobromide. In similar tests on fungi, good inhibition of growth of *Candida albicans* was obtained with about 0.2 milliliter of a 1 percent solution in 50 percent alcohol of 2-benzyl-5,6-dihydro-4,6-dimethyl-4H-1,3,4-thiadiazine, of 2(o-methoxyphenyl)-5,6-dihydro-4,6,6-trimethyl-4H-1,3,4-thiadiazine or of 2(p-tolyl)-5,6-dihydro-4,6,6-trimethyl-4H-1,3,4-thiadiazine.

I claim:
1. A compound selected from the group consisting of 5,6-dihydro-4H-1,3,4-thiadiazines having the formula

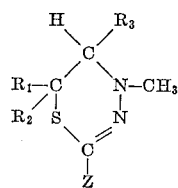

wherein $R_1$ is selected from the group consisting of phenyl, methyl, and hydrogen, $R_2$ and $R_3$ are independently selected from hydrogen and methyl and Z is selected from the group consisting of cyclohexyl, benzyl, phenyl and substituted phenyl wherein said substituted phenyl bears from one to two substituents selected from the group consisting of halogens, hydroxy lower alkyl, lower alkoxy and nitro, and the mineral acid salts thereof.

2. 4,5 - dimethyl - 2,6 - diphenyl - 5,6 - dihydro - 4H-1,3,4-thiadiazine.
3. 2 - (p - chlorophenyl) - 5,6 - dihydro - 4 - methyl - 6-phenyl-4H-1,3,4-thiadiazine.
4. 5,6 - dihydro - 4,6 - dimethyl - 2 - phenyl - 4H-1,3,4-thiadiazine.
5. 2 - (p - chlorophenyl) - 5,6 - dihydro - 4,6 - dimethyl-4H-1,3,4-thiadiazine.
6. 2 - (p - chlorophenyl) - 5,6 - dihydro - 4,6 - dimethyl-4H-1,3,4-thiadiazine hydrobromide.
7. 2 - (p - methoxyphenyl) - 5,6 - dihydro - 4,6 - dimethyl-4H-1,3,4-thiadiazine hydrobromide.
8. 2 - benzyl - 5,6 - dihydro - 4,6 - dimethyl - 4H - 1,3,4-thiadiazine.
9. 2 - (o - methoxyphenyl) - 5,6 - dihydro - 4,6,6 - trimethyl-4H-1,3,4-thiadiazine.
10. 2 - (p - tolyl) - 5,6 - dihydro - 4,6,6 - trimethyl - 4H-1,3,4-thiadiazine.
11. A method for preparing 5,6-dihydro-1,3,4-thiadiazines which comprises heating with an organic solvent a mixture of substantially equimolar proportions of phosphorus pentasulfide and a 2($\beta$-hydroxy-alkyl) acid hydrazide having the formula

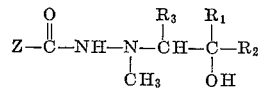

wherein $R_1$ is selected from the group consisting of phenyl, methyl, ethyl and hydrogen, $R_2$ and $R_3$ are independently selected from hydrogen and methyl and Z is selected from the group consisting of cyclohexyl, benzyl, phenyl and substituted phenyl wherein said substituted phenyl bears from one to two substituents selected from the group consisting of halogens, hydroxy, lower alkyl, lower alkoxy and nitro, and separating the thiadiazine product from the reaction mixture.

References Cited by the Examiner

Sato et al., Yakaguku Zasshi, vol. 77, pp. 771–774 (1957); abstracted C. A., vol. 51, columns 17941–2 (1957) QD 1.AS1.

WALTER A. MODANCE, *Primary Examiner.*

JOHN M. FORD, *Assistant Examiner.*